United States Patent Office 3,501,553
Patented Mar. 17, 1970

3,501,553
AMIDE-EPOXIDE COMPOSITIONS
Hugh A. Farber and John C. Safranski, Jr., Midland, Mich., assignors to The Dow Chemical Company, Midland, Mich., a corporation of Delaware
No Drawing. Continuation-in-part of application Ser. No. 423,855, Jan. 6, 1965. This application Mar. 18, 1968, Ser. No. 714,045
Int. Cl. C08g 45/04
U.S. Cl. 260—836                    9 Claims

ABSTRACT OF THE DISCLOSURE

Novel crosslinkable compositions are prepared by combining an interpolymer having pendant carboxamide and/or sulfonamide groups with a polyepoxide having more than one oxirane group per molecule. The interpolymers may contain from 15 to 30% by weight of pendant carboxamide, as exemplified by vinyl aromatic sulfonamides, vinyl aliphatic sulfonamides, acrylamide and methacrylamide. In an example 10 g. of a solution of a copolymer of 30% acrylamide and 70% butyl acrylate were reacted with a stoichiometric amount of an epoxide, e.g. 0.89 g. of vinyl cyclohexene dioxide.

CROSS REFERENCE

This application is a continuation-in-part of our copending application Ser. No. 423,855 filed on Jan. 6, 1965 now abandoned.

BACKGROUND OF THE INVENTION

This invention relates to thermosettable amide-epoxide resin compositions which comprise a polyepoxide resin having more than one oxirane group per molecule and an interpolymer having pendant amide groups wherein said amide groups are derived from a carboxamide monomer and/or a sulfonamide monomer, and a process of making the same.

U.S. Patent 2,589,245, describes resinous amide-epoxide compositions comprising insoluble, infusible products. U.S. Patent 2,712,001 describes resinous sulfonamide-epoxide compositions that are insoluble infusible products.

SUMMARY OF THE INVENTION

The present invention is directed towards crosslinkable amide-epoxide compositions. More particularly the compositions comprise (a) a polyepoxide resin having more than one oxirane group per molecule and (b) an interpolymer having pendant amide groups obtained by polymerizing from about 15 to about 30 percent by weight of a carboxamide monomer, a sulfonamide monomer or mixtures thereof with about 85 to about 70 percent by weight of at least one other copolymerizable monomer having no epoxide reactive sites. The cured compositions exhibit marked chemical resistance and possess excellent physical properties.

DETAILED DESCRIPTION

Amide monomers useful in preparing the inter-polymers of this invention are carboxamide and/or sulfonamide monomers. Suitable carboxamides include acrylamide, methacrylamide and the like. Said sulfonamide monomers include vinyl aliphatic sulfonamides, vinyl aromatic mono- and disulfonamides and the like. Suitable aromatic sulfonamide monomers include vinylbenzene sulfonamide, vinyltoluene sulfonamide, vinylnaphthalene sulfonamide, vinylbenzene disulfonamide, the isomers thereof and the like. Aliphatic sulfonamides include ethenesulfonamide, allylsulfonamide and various substituted derivatives thereof which have a terminal vinylidene group.

Vinyl and vinylidene monomers which may be polymerized with said carboxamide or sulfonamide monomers include those monomers having no epoxide reactive sites such as carboxylic acid or anhydride. Preferably included in said polymerizable monomers are monovinyl aromatic monomers having the general formula

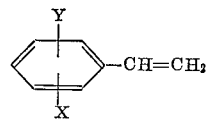

wherein X and Y each represent a member of the group consisting of hydrogen, halogen and alkyl radicals having from 1 to 4 carbon atoms; acrylate esters having the general formula

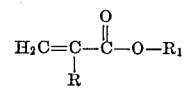

wherein R is hydrogen or methyl and $R_1$ is an alkyl radical having from 1 to 8 carbon atoms; acrylonitrile and methacrylonitrile; vinyl ethers; maleate esters; vinyl pyrrolidone, N-vinyl-5-methyl-2-oxazolidinone and the like; vinyl acetate; and the like.

Examples of said polymerizable monomers include styrene, ethyl acrylate, butyl acrylate, 2-ethylhexyl acrylate, methyl methacrylate, butyl methacrylate, vinyltoluene, isopropylstyrene, vinylxylene, chlorostyrene, dichlorostyrene, tert.-butylstyrene and the like.

The interpolymer can be prepared by the solution polymerization of the carboxamide monomer or the sulfonamide monomer in amounts of from 15 to 30 percent by weight in admixture with from 85 to 70 percent by weight of the copolymerizable monomer having no epoxide reactive sites.

Polyepoxides useful for the present invention comprise all aromatic and aliphatic polyepoxides commercially available. Preferably, the polyepoxides are glycidyl polyethers of polyhydric alcohols or phenols and contain more than one oxirane group per molecule.

Polyepoxides useful in making the novel compositions are m-diisopropenyl benzene diepoxide, divinyl benzene diepoxide, 3,4 - epoxy - 6-methyl cyclohexyl methyl-3,4-epoxy - 6 - methyl cyclohexane carboxylate, vinylcyclohexene dioxide, dicyclopentadiene diepoxide, dipentene dioxide, diglycidyl ether of 2,2-bis(4-hydroxyphenyl)-propane, the diglycidyl ether of polypropylene glycol, epoxy novolacs, the various halogen containing polyepoxides, and the like.

The amount of the polyepoxide employed can be varied from about 0.1 equivalent of epoxide per amide group of the interpolymer to more than two equivalents per amide group. The proportions are dependent on the percentage of the amide in the interpolymer, the molecular weight of the interpolymer and/or polyepoxide and the ultimate crosslink density and the chemical and physical properties desired.

A catalyst is not usually required for the crosslinking or curing reaction, but catalysts are often advantageously employed. Part of the uniqueness of the present compositions resides in their relatively stable pot life. The carboxamide-polyepoxide compositions have a long pot life, while the sulfonamide-polyepoxide compositions have a relatively shorter pot life. A mixture of the components is stable at ambient temperatures. When a fast rate of cure is desired, appropriate quantities of a catalyst or accelerator can be added. Typical catalysts are sodium hydroxide, stannous octoate, and 2,4,6-tri(dimethylamino methyl) phenol.

The temperatures necessary to cure the compositions can range from about 250° F. to about 450° F., preferably from about 300° F. to about 400° F. Curing of the amide-polyepoxide compositions is usually complete when heated within this preferred temperature range for about 30 minutes to about 2 hours.

The novel amide-epoxide compositions of the present invention exhibit remarkable and unexpected properties quite different from any polymers of similar composition known to the art. The compositions herein described are useful in making varnishes, protective coatings, adhesives, films, and fibers. They are also useful for laminating glass and for encapsulating electronic components, and the like.

The following examples are illustrative of the present invention, but are not to be construed as limiting the scope thereof.

EXAMPLE 1

A styrene-sulfonamide copolymer was prepared by heating a mixture of:

|  | Grams |
|---|---|
| p-Vinylbenzene sulfonamide | 3 |
| Styrene | 12 |
| Acetone | 25 |
| Xylene | 150 |
| Azobisisobutyronitrile | 0.25 | at 50° to 65° C. for 8 hours. At the end of this time, the copolymer was precipitated by pouring the mixture into methyl alcohol. The conversion was 33 percent. Infrared analysis showed the presence of the sulfonamide group in the solid polymer.

The p-vinylbenzene sulfonamide was generally prepared according to the procedure described by Wiley et al., J. Am. Chem. Soc. 75, 4519 (1953) which reportedly produces p-vinylbenzene sulfonamide. The monomer may contain minor amounts of the isomers.

EXAMPLE 2

One gram of the copolymer prepared in Example 1 was mixed with 0.4 gram of m-diisopropenyl benzene diepoxide, in 4 grams of dimethyl sulfoxide as solvent. The resultant solution was spread as a layer on a bonderized steel plate and dried and baked for 30 minutes at 350° F. There was obtained a slightly yellow, hard film. It was unaffected by a 90 second rub with acetone.

EXAMPLE 3

A 30 weight percent solution of a 30 weight percent acrylamide-70 weight percent butyl acrylate copolymer was prepared by polymerizing the monomers in dimethyl formamide as a solvent using benzoyl peroxide as a catalyst. The reaction was carried out at 70° C. The conversion was 100 percent.

In each of a series of experiments, 10 grams of the solution of the copolymer was mixed with a stoichiometric amount of a diepoxide of a kind as stated in the following Table 1. The resulting solution was applied to steel panels, was dried and the film was baked for 1 hour at a temperature as shown in said table with results as shown therein.

EXAMPLE 4

Five grams of a 20 weight percent solution of a 15 percent acrylamide-85 percent butylacrylate copolymer dissolved in acetone was mixed with 0.4 gram of m-diisopropenylbenzene diepoxide. The resulting solution was cast as a film on steel panels and was baked at 350° F. for 1 hour. The resultant coating showed only slight attack by rubbing for 1 minute with acetone.

EXAMPLE 5

A 5 gram portion of a 20 weight percent solution of a 20 percent acrylamide-80 percent styrene copolymer dissolved in dimethyl-formamide was mixed with a stoichiometric amount of m-diisopropenylbenzene diepoxide (0.26 g.). A film prepared by baking a coated steel panel at 300° F. for 1 hour, was hard, well adhered, and solvent resistant.

Similar results are obtained by replacing the epoxides used in the foregoing examples with diglycidyl ether of bisphenol A. Similar results are also obtained by replacing the interpolymers used in the foregoing examples with one of the following: an interpolymer of styrene-acrylamide - acrylonitrile, styrene - diethylmaleate - acrylamide, or vinyl pyrrolidone-acrylamide-ethyl acrylate.

EXAMPLE 6

A polymer was prepared by polymerizing the following:

|  | Grams |
|---|---|
| Ethenesulfonamide ($CH_2=CH-SO_2-NH_2$) | 1.25 |
| Butyl acrylate | 5.0 |
| Absolute ethyl alcohol (anhydrous) | 15.0 |
| Azobisisobutyronitrile | 0.1 |

The monomer solution was heated at 60–65° C. for about 12 hours. After cooling a clear, oily, viscous solution (21.2 gm.) was obtained. The product, by infra-red analysis, showed a strong —NH doublet at $2.95\mu$ and $3.05\mu$, a strong ester at $5.85$–$5.90\mu$ and $>SO_2$ near $8.6\mu$. The ethenesulfonamide was prepared generally according to the procedure described by A. S. Matlack in J. Polymer Sci., 23, 729 (1958).

Assuming one reactive NH group per sulfonamide the polymer had a calculated equivalent weight of about 535. A mixture of 5 gms. of the polymer solution and 0.5 gm. of a diglycidyl ether of bisphenol A having an epoxide equivalent weight of 186–192 was prepared. A coating on a phosphatized metal panel was prepared and allowed to air dry for 30 minutes. The film was not completely cured (soluble in acetone) but was not tacky. Curing of the film at 300° F. for 30 minutes produced a hard, slightly hazy film with excellent gloss, adhesion and flexural properties, a pencil hardness of 6H to 9H and the film was unaffected by a 2 minute rub with acetone.

TABLE 1

| Run No. | Diepoxide, gm. | Baking time (hr.) | Temp., °F. | Remarks |
|---|---|---|---|---|
| 1 | 1.78 g. of (Unox 201) 3,4-epoxy-6-methyl cyclohexyl methyl-3,4-epoxy-6-methyl cyclohexane carboxylate. | 1 | 350 | Good film; 60 second acetone rub shows hazing and softening of baked film. |
| 2 | 0.89 g. (Unox 206) vinyl cyclohexene dioxide. | 1 | 350 | Good film; has less solvent resistance than Run 1. |
| 3 | 1.05 g. (Unox 207) dicyclopentadiene diepoxide. | 1 | 350 | Do. |
| 4 | (Unox 269) dipentene dioxide (1.07 g.). | 1 | 400 | Good film; 60 second acetone rub results in slight hazing and softening of film. |
| 5 | m-Divinyl benzene diepoxide (1.02 g.) | 1 | 300 | Do. |
| 6 | m-Diisopropenyl benzene diepoxide (1.21 g). | 1 | 300 | Hard film; 60 second acetone rub results in hazing and very slight softening of film. |

We claim:
1. A crosslinkable resin composition comprising (1) an interpolymer having pendant amide groups, said interpolymer obtained by polymerizing from about 15 to about 30 percent by weight of an amide monomer selected from the group consisting of vinyl aromatic mono- and disulfonamides, vinyl aliphatic sulfonamides, acrylamide, methacrylamide and mixtures thereof and correspondingly from about 85 to about 70 percent by weight of at least one other copolymerizable monomer having no epoxide reactive sites, and (2) a polyepoxide having more than one oxirane group per molecule, said polyepoxide added in an amount corresponding to at least 0.1 equivalent of epoxide per each amide group of the interpolymer.

2. A composition as claimed in claim 1 wherein said interpolymer is a copolymer of butyl acrylate and acrylamide.

3. A composition as claimed in claim 2 wherein the polyepoxide is dipentene diepoxide, divinyl benzene diepoxide or a diglycidyl ether of bisphenol A.

4. A composition as claimed in claim 1 wherein the interpolymer is a copolymer of styrene and p-vinylbenzene sulfonamide.

5. A composition as claimed in claim 1 wherein the interpolymer is a copolymer of butyl acrylate and ethenesulfonamide.

6. A composition as claimed in claim 1 wherein the amount of the polyepoxide ranges from 0.1 to 2 equivalents of epoxide per amide group.

7. A composition as claimed in claim 1 wherein the vinyl aliphatic sulfonamide monomer is ethenesulfonamide.

8. A composition as claimed in claim 1 wherein the vinyl aromatic sulfonamide is p-vinylbenzene sulfonamide.

9. An article comprising the heat cured composition of claim 1.

References Cited
UNITED STATES PATENTS 3,378,601   4/1968   Tanaka _____ 260—831

FOREIGN PATENTS 226,747   11/1958   Australia.

SAMUEL H. BLECH, Primary Examiner

PAUL LIEBERMAN, Assistant Examiner

U.S. Cl. X.R.

117—132, 161; 161—185; 260—2, 30.8, 32.6, 32.8, 47, 78.5, 79.3, 80.3, 80.72, 837